Nov. 2, 1926.  1,605,291
L. C. SCHMIDT
SAFETY BRAKE FOR STEPLADDERS AND THE LIKE
Filed Dec. 6, 1924  2 Sheets-Sheet 1

INVENTOR.
Leonadas C. Schmidt
BY
Hardway & Cathey
ATTORNEYS.

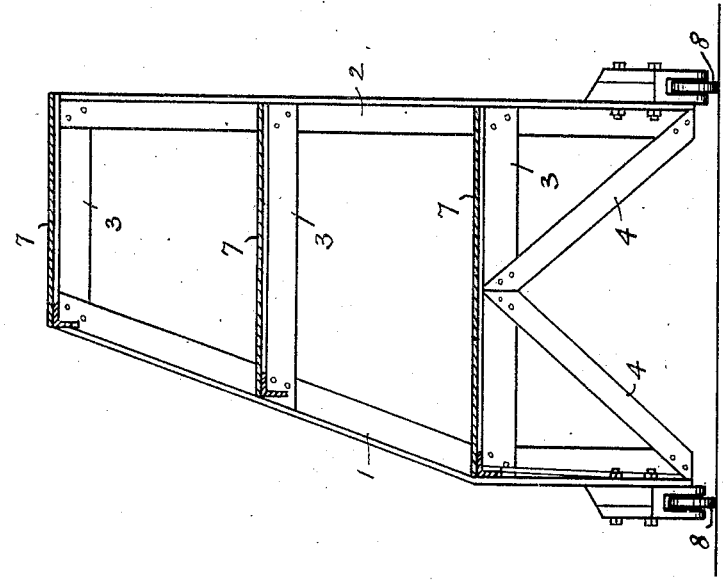
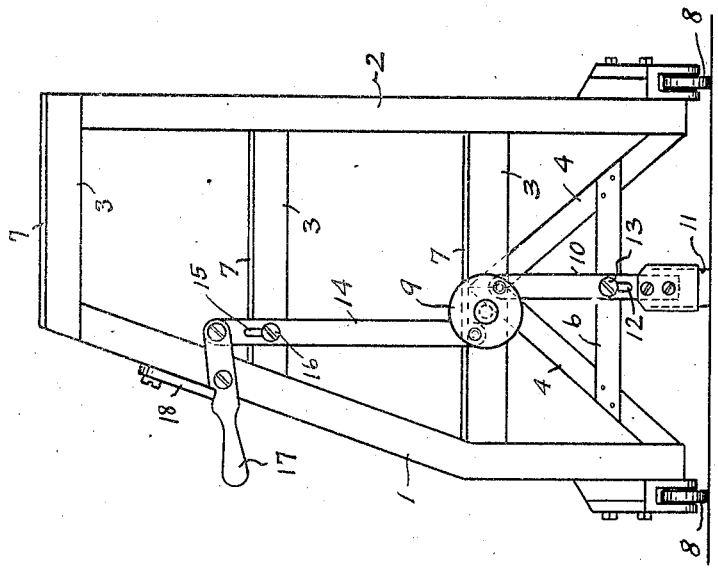

Patented Nov. 2, 1926.

1,605,291

UNITED STATES PATENT OFFICE.

LEONADAS C. SCHMIDT, OF HOUSTON, TEXAS.

SAFETY BRAKE FOR STEPLADDERS AND THE LIKE.

Application filed December 6, 1924. Serial No. 754,426.

This invention relates to new and useful improvements in a safety brake for step ladders and the like.

One object of the invention is to provide a safety brake specially designed for use in connection with step ladders, chairs, stools and similar articles of furniture which are mounted on casters and is designed to hold the article of furniture against moving or accidental displacement when the same is in use.

With the above and other objects in view the invention has particular relation to certain novel features of construction, operation and arrangement of parts, an example of which is given in this specification and illustrated in the accompanying drawings, wherein:—

Figure 3 shows an end view and

Figure 4 shows a vertical sectional view taken on the line 4—4 of Figure 1.

Figure 1:
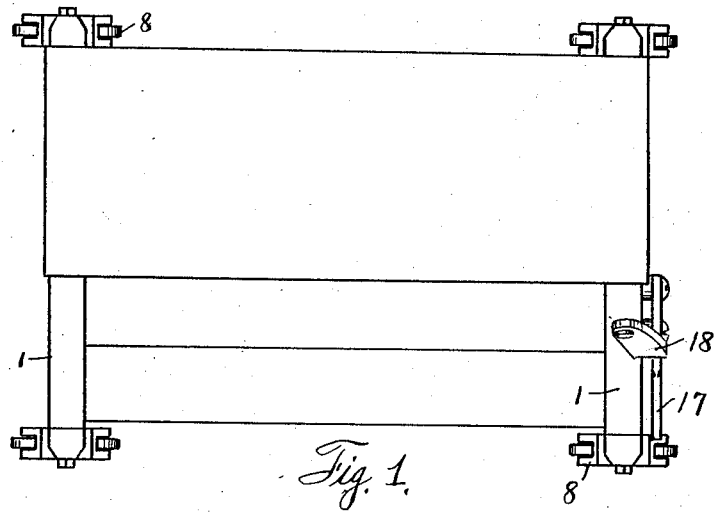
Figure 1 shows the plan view of a combination step ladder and table with the safety brake applied thereto.
Figure 2:
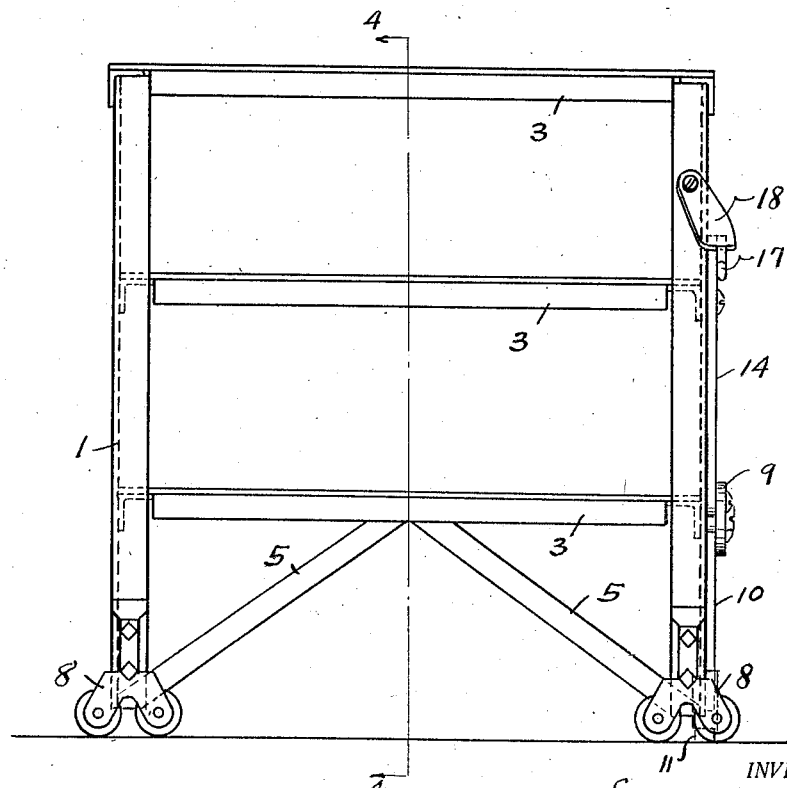
Figure 2 is a side elevation thereof.

Referring now more particularly to the drawings wherein like numerals of reference designate similar parts in each of the figures, the numerals 1 and 2 designate the front and rear supporting legs, respectively, of a combination step ladder and table, and the numerals 3 designate suitable cross braces, which together with the corner legs form the supporting frame work. The frame work is braced by means of suitable diagonal end braces 4, 4, and front and rear braces 5, 5. At one end the diagonal braces 4 are connected by a suitable connecting bar 6. The frame work is equipped with spaced shelves 7, which are supported by the respective cross braces 3. The numeral 8 refers to the rollers, or casters on which the device is mounted so that it can readily be moved from place to place as needed.

It is often desirable to lock a stool, table or step ladder, which is mounted on casters, against accidental moving or displacement, and for this purpose I have provided a brake which will now be described. Rotatably mounted on one of the lower end cross braces 3 there is a disc 9 and pivoted, at its upper end to one side of this disc there is a brake bar 10 whose lower end carries a brake shoe 11, preferably of rubber. This brake bar has an oblong slot 12 and a set screw 13 is fitted through this slot and screwed into the cross bar 6. Pivoted at its lower end to the other side of the disc 9 there is a link 14 which has a slot 15 and the set screw 16 is fitted through this slot and screwed into the middle end bar 3. A brake lever 17 is pivoted to the adjacent front supporting leg 1 and its inner end is pivoted to the upper end of the link 14. A latch 18 is pivoted to the corresponding leg and is adapted to engage with the brake lever 17.

When it is desired to set the brake the outer free end of the brake lever 17 is forced downwardly and this will operate to force the brake shoe 11 against the floor and the latch 18 is then engaged against the brake lever to hold said brake in set position. The brake may be readily released by disengaging the latch and elevating the free end of the brake lever 17.

What I claim is:—

The combination with a supporting structure having front and rear supporting legs and castors whereon the structure is mounted, of a vertical brake bar whose lower end is provided with a brake shoe, a link, a pivotally mounted connecting member to which the upper end of said bar and the lower end of said link are pivotally connected on opposite sides of the pivot of said member, said bar and link being connected to said structure and adjustable lengthwise thereon, a brake lever pivoted to said supporting structure having one end pivoted to the upper end of said link and its other end formed with a hand grip and a latch pivotally connected to said supporting structure and adapted to be releasably engaged with said brake lever.

In testimony whereof I have signed my name to this specification.

LEONADAS C. SCHMIDT.